C. J. ROTHERMEL.

TENSIONAL JOINT.

APPLICATION FILED FEB. 16, 1918.

Reissued June 11, 1918.

14,482.

Inventor:
Curtis J. Rothermel

By Sebastian Hinton

Atty.

UNITED STATES PATENT OFFICE.

CURTIS J. ROTHERMEL, OF PHILADELPHIA, PENNSYLVANIA, ASSIGNOR, BY MESNE ASSIGNMENTS, TO SIGNODE SYSTEM, INC., OF CHICAGO, ILLINOIS.

TENSIONAL JOINT.

14,482. Specification of Reissued Letters Patent. Reissued June 11, 1918.

Original No. 1,123,805, dated January 5, 1915, Serial No. 831,607, filed April 13, 1914. Application for reissue filed February 16, 1918. Serial No. 217,700.

*To all whom it may concern:*

Be it known that I, CURTIS J. ROTHERMEL, a citizen of the United States, and a resident of Philadelphia, in the county of Philadelphia and State of Pennsylvania, have invented certain new and useful Improvements in Tensional Joints, of which the following is a specification.

The object of my invention is to provide a sealed joint for the mutually overlapped ends of a tension resisting box strap, wherein the joint comprises mutually interlocking deformations in the strap ends and in a stiff reinforcing girth, each of said deformations being capable individually of offering substantial resistance to tensional strains on the strapping, and when coöperating with the other deformations resulting in a simple but very strong joint for especially designed tension resisting purposes.

In the drawings:—

Figure 1:
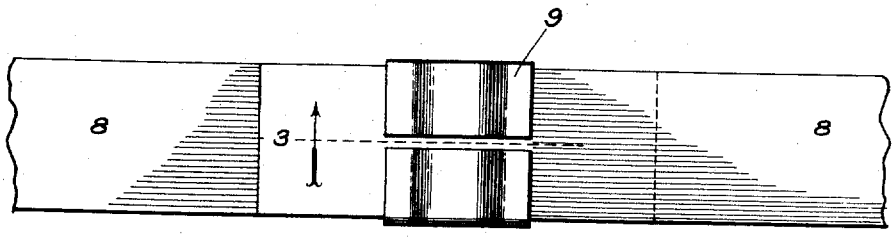
Figure 1 is a plan view of a joint constructed according to my invention.
Figure 2:
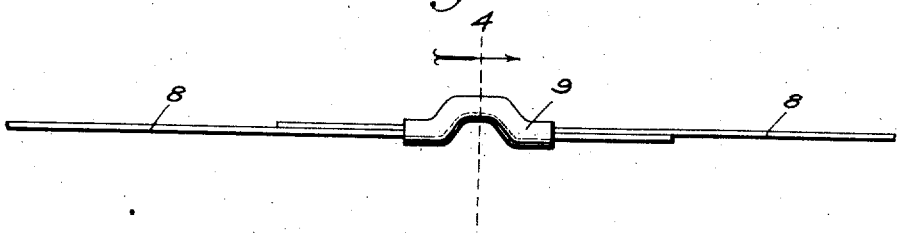
Fig. 2 is an elevation thereof.
Figure 3:
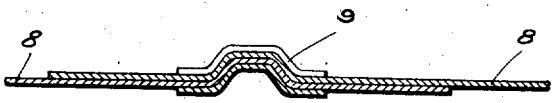
Fig. 3 is a sectional view on line 3 of Fig. 1.
Figure 4:
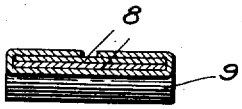
Fig. 4 is a sectional view on line 4 of Fig. 2.

To join a strip or band 8 of flexible metal, I apply a girth 9 of flexible metal by bending it transversely about the overlapping end-portions and bringing the ends of the girth-strap closely together. A suitable crimping tool is then applied to the girth to indent it on one side between its edges and protrude it correspondingly on the opposite side, thereby similarly crimping the double thickness of the band 8. The joint thus produced forms a very strong splice, the strength of which may be increased by using thicker metal for the girth. Thus, where the strapping is not in itself stiff enough when supplied with a transverse crimp such as shown in the drawings to result in a joint which can stand heavy tensional strains if supplied merely with a light girth, the strength of the joint can be rendered sufficient for the desired purpose by employing a heavy or thick girth which will afford strong tension-resisting shoulders to assume the tensional strains and resist the tendency of the deformations in the strap ends otherwise to pull apart.

I have more immediately devised this form of my improvement for splicing the metal straps fastened at intervals about cylindrical crates used for shipping linoleum, and the like, in rolls. The splice is made in a space between adjacent staves of the crate, either with one crimp, as shown, or with more than one where the girth used is sufficiently wide. The protruding face of the crimp then extends inwardly to avoid projecting it beyond the face of the crate, where it would be liable to catch when one crate is dragged across another.

As will be seen, by crimping the solid metal girth into the strap-sections inside it, strain tending to undo the splice would have to straighten out the crimps in the overlapping ends before they can be pulled apart. This is practically impossible, however, since the double walls of the crimp in the girth so confine between them the corresponding sections of the overlapping band-ends as to effectually resist straightening of the latter.

The joint of my invention is a sealed joint and cannot be tampered with without detection. Furthermore, the interlocking deformations in the two strap ends and the two sides of the girth each has the capacity to afford substantial resistance to longitudinal strains on the strapping; and when each of these deformations mutually reinforces and is reinforced by the deformations in the other three layers of stiff metal, an extremely strong joint for tension resisting purposes is formed and one peculiarly designed for use on box strapping or for strapping extremely heavy bales or crates of linoleum.

Having now described my invention, I claim:—

1. A splice-joint comprising the mutually-overlapping ends of a flexible-metal strip and a flexible-metal girth encircling said ends, said girth and overlapping strip ends being simultaneously crimped together, whereby said strip ends are confined at their crimp between the crimped walls of the said girth.

2. A splice-joint comprising the mutually-overlapping ends of a flat flexible-metal strip, and a girth formed of a flat flexible-metal strip bent to surround said ends, said girth and overlapping strip ends being simultaneously crimped together, whereby said strip ends are confined at their crimp between the crimped walls of said girth.

3. A sealed joint for the mutually overlapped ends of flat tensional box strapping comprising in combination the mutually overlapped tensional strap ends and a reinforcing girth comprising a strip of stiff metal bent around the overlapped strap ends, the strap ends and reinforcing girth being thereafter simultaneously crimped to afford a conjoint deformation, transverse to the strap ends, in both strap ends and in the walls of said reinforcing girth and on both sides of the strap ends, whereby the strap ends and girth are provided with conjoint interlocking transverse deformations and a tension resisting joint thereby produced, in which each of the strap ends and sides of the reinforcing girth contribute to the tensional strength of the joint by the mutual effect of their interlocking deformations.

4. A tension resisting joint for tensional box strapping comprising in combination two mutually overlapped box strap ends, and a reinforcing girth, of metal of a thickness appropriate to the desired strength of the completed joint, embracing the mutually overlapped strap ends, the reinforcing girth and overlapped strap ends being all simultaneously crosswise of the strap deformed into a conjoint interlocked tension resisting deformation to provide a tension resisting joint in which the strength of the tension resisting shoulders on the reinforcing girth prevents the deformed sections of the strap ends from being pulled out of their interlocking deformations.

5. A method of forming a tension-resisting joint connecting strap ends and adapted to resist heavy tensional strains on the strap, which comprises assembling the strap ends overlapped in face to face contact, with an embracing flexible metal reinforcing and strengthening girth having walls of a thickness sufficient to render them effectually stiff when flexed and resistant against being straightened out; and simultaneously crosswise of the strap crimping the strap ends and girth, and forming in them mutually interlocking, abrupt tension-resisting bends or shoulders disposed across the line of tension on the strap, whereby the double embracing walls of the crimp in the girth so confine between them the corresponding sections of the overlapping strap ends as to resist effectually the straightening of said bends or shoulders.

6. A tension-resisting joint for tension resisting box-strapping comprising, in combination, two mutually overlapped box-strap ends and a reinforcing girth, crimping means for deforming the material of said strap ends and girth crosswise of said straps.

In witness whereof, I hereunto subscribe my name to this specification in the presence of two witnesses.

CURTIS J. ROTHERMEL.

Witnesses:
JOHN RODGERS,
CHAS. B. SWIFT.